United States Patent [19]

Fergg et al.

[11] 4,192,605
[45] Mar. 11, 1980

[54] METHOD AND APPARATUS FOR MAKING COLOR PRINTS

[75] Inventors: Berthold Fergg, Taufkirchen; Günter Findeis, Sauerlach; Wolfgang Zahn, Munich, all of Fed. Rep. of Germany

[73] Assignee: AGFA-Gevaert Aktiengesellschaft, Fed. Rep. of Germany

[21] Appl. No.: 903,691

[22] Filed: May 8, 1978

[30] Foreign Application Priority Data

May 17, 1977 [DE] Fed. Rep. of Germany ....... 2722321

[51] Int. Cl.² ................................................. G03B 78
[52] U.S. Cl. ........................................ 355/38; 355/77; 355/88
[58] Field of Search ..................... 355/38, 83, 88, 77, 355/35; 356/175, 404

[56] References Cited

U.S. PATENT DOCUMENTS

| 3,029,691 | 4/1962 | Goddard et al. | 355/38 |
| 3,502,410 | 3/1970 | King et al. | 355/38 |
| 3,653,759 | 4/1972 | Klein | 355/38 |
| 3,697,174 | 10/1972 | McCune | 355/38 |
| 3,867,029 | 2/1975 | Weinert | 355/38 |

Primary Examiner—L. T. Hix
Assistant Examiner—W. J. Brady
Attorney, Agent, or Firm—Peter K. Kontler

[57] ABSTRACT

Color prints from transparencies which constitute frames or sections of universal film are made on printing paper by ascertaining the quotient or difference of integrated transmittance of the transparencies in green and red light, comparing the signal which denotes such ratio with a variable reference signal whereby the resulting comparison signal denotes the color temperature of light by which the respective transparency was exposed, and carrying out color corrections to depart from correction to neutral gray in dependency upon whether the ascertained color temperature denotes exposure in daylight or artificial light. The value of the reference signal is changed in such a way that the intensity of the ratio-designating signal which is necessary for generation of a comparison signal denoting the switchover point between the classification of transparencies into those respectively exposed by daylight and artificial light is lowered when the overall density of the transparency is lower and vice versa.

13 Claims, 2 Drawing Figures

METHOD AND APPARATUS FOR MAKING COLOR PRINTS

BACKGROUND OF THE INVENTION

The present invention relates to a method and apparatus for making photographic color prints on color sensitive printing material, and more particularly to improvements in a method and apparatus for making color prints from color transparencies made on multiple-purpose film which was exposed by light of one of a plurality of different color temperatures, especially by daylight or artificial light. Still more particularly, the invention relates to improvements in a method and apparatus for making color prints by carrying out color corrections to deviate from gray in dependency on determination whether the exposure was made by daylight or artificial light. The determination involves ascertaining the ratio (difference or the quotient) of transmittances in two colors which are influenced by the color temperature of light by which the original was exposed, and comparing the resulting signal with a threshold value.

U.S. Pat. No. 3,029,691 to Goddard et al. discloses an apparatus for making color prints wherein integrated red transmittance is compared with integrated blue transmittance. It has been found that such comparison is not a reliable way of distinguishing between exposures by daylight or artificial light. This is due to the fact that the color shifts between such types of exposures are not most pronounced in red and blue colors and also because, in the case of average ratio of these colors, the difference is less when the intensity of light by which the original was exposed is low. Thus, resort to a fixed threshold value does not invariably guarantee optimum results.

OBJECTS AND SUMMARY OF THE INVENTION

An object of the invention is to provide a novel and improved method which insures highly reliable discrimination between exposures which were made by different types of light and which further insures that the type of light by which a frame or section of universal film was exposed is invariably considered in making adjustments preparatory to reproducing the image of such frame or section on color-sensitive photographic paper or the like.

Another object of the invention is to provide a novel and improved apparatus for the practice of the above outlined method.

A further object of the invention is to provide a novel and improved printer for making color prints from color transparencies made on universal film which was exposed either by daylight or by artificial light.

One feature of the invention resides in the provision of a method of making color prints on color sensitive printing material from color transparencies made on universal film by exposure to light of different color temperature, especially daylight or artificial light. The method comprises the steps of uniformly illuminating successive transparencies by light including the three primary colors red, green and blue, ascertaining the density of each transparency (i.e., the amount of light by which the respective transparency was exposed), measuring the integrated transmittances of each transparency in two different colors (preferably red and green) which transmittances are influenced by the color temperature of light by which the respective transparency was exposed, generating for each transparency a first signal a characteristic of which denotes a predetermined ratio (difference or quotient) of the transmittances (such first signal can be generated by an integrating amplifier one input of which receives signals denoting the integrated transmittance in red and the other input of which receives a signal denoting the integrated transmittance in green), comparing the characteristic of the first signal with the corresponding characteristic of a reference signal denoting a threshold value (such reference signal can be furnished by a second integrating amplifier one input of which is connected to a source of constant current and the other input of which receives a signal denoting the color undercorrection in all three colors) whereby the resulting comparison signal (which can be transmitted by the output of a differential or comparator amplifier whose inputs are connected to the outputs of the aforementioned integrating amplifiers) denotes the color temperature of the light by which the respective transparency was exposed, varying the characteristic of the reference signal as a function of differences between the measured densities of successive transparencies, and regulating the reproduction of each transparency on printing material in dependency on the color temperature of light as denoted by the comparison signal (i.e., color corrections to deviate from neutral gray compensation will be different when the comparison signal denotes that the transparency was exposed by daylight than when the comparison signal denotes that the transparency was exposed by artificial light).

The aforementioned varying step preferably includes altering the characteristic of the reference signal to reduce the intensity of that first signal which, when compared with the reference signal, results in the generation of a comparison signal denoting the borderline or switchover point between exposures by daylight and artificial light when the density of a next-following transparency is less than the density of the preceding transparency, and vice versa. In other words, the intensity or another characteristic of the reference signal is changed in such a way that the comparator amplifier transmits a signal denoting exposure by daylight or artificial light in response to transmission of a first signal of lower intensity when the density of the respective transparency is relatively low, i.e., when the ascertained amount of light by which such transparency was exposed is relatively low.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
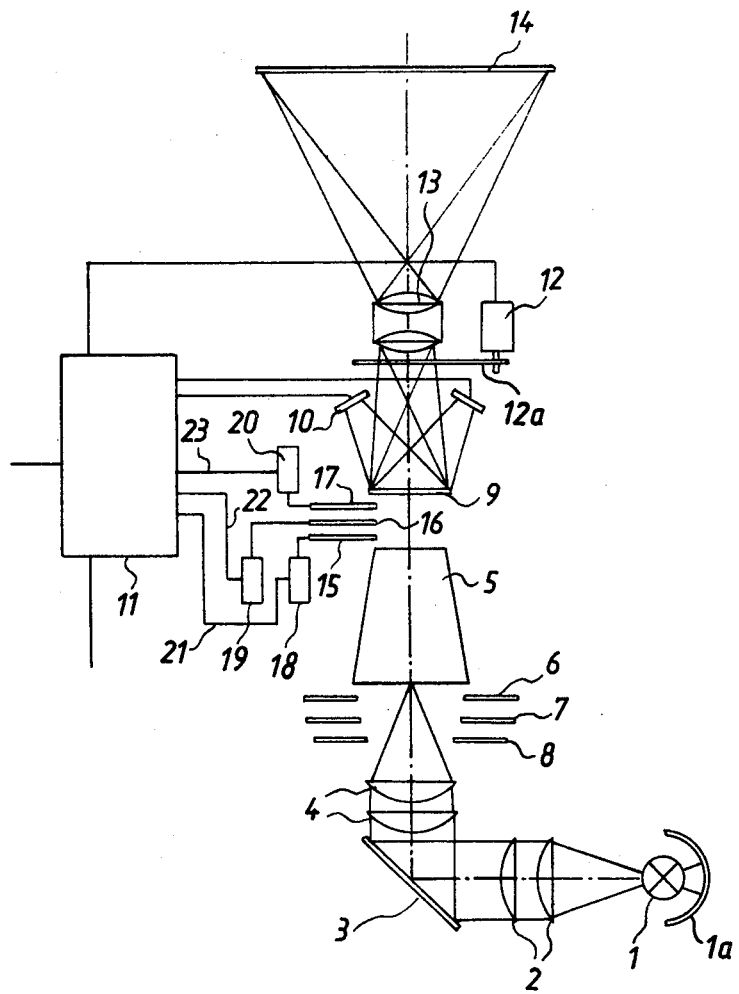
FIG. 1 is a schematic view of a color printing apparatus which embodies the invention.

Referring to FIG. 1, there is shown a color printer which is similar to the apparatus disclosed in German Auslegeschrift No. 2,246,466. The color printer of FIG. 1 includes a light source 1 which is installed in front of a reflector 1a, a first twin condenser lens system 2 in the path of printing light issuing from the source 1, a second twin condenser lens system 4, and a cold light mirror 3 which is mounted between the lens systems 2 and 4. The source 1 emits light in each of the necessary wavelength regions. Printing light which issues from the lens system 4 passes through a light mixing duct 5 which is mounted downstream of three color filters 6, 7 and 8 in complementary colors. The extent to which the filters 6–8 are moved across the path of light between the lens system 4 and the mixing duct 5 depends on the sensitivity of the color sensitive printing material. In this manner, the filters change the color of printing light as a function of sensitivity of the printing material. The duct 5 mixes the light which passes therethrough so that brightness and color distribution of light that reaches the original 9 is uniform. The original 9 is a transparency which was exposed by daylight or artificial light and constitutes a frame or section of universal film.

The light which passes through the original (transparency) 9 impinges upon photodetectors (including those shown at 10) which are disposed behind filters (not specifically shown) that transmit only blue, green or red light. The photodetectors (including those shown at 10) are preferably silicon detectors and are adjacent to the main light path, i.e., they are exposed to stray light. Reference may be had to commonly owned copending patent application Ser. No. 872,620 filed Jan. 26, 1978 by Franz Hofstetter.

The outputs of the photodetectors are connected to the corresponding inputs of an exposure control circuit 11 which controls the positions of three color filters 15, 16 and 17. Each of these color filters can be indexed into the path of homogeneous printing light between the duct 5 and the original 9.

The circuit 11 further controls an electromagnet 12 for a shutter 12a which is installed in front of an objective 13. The latter images the original 9 onto a sheet 14 of color sensitive printing material. The sheet 14 is preferably a roll whose ends are connected to the cores of customary supply and takeup reels, and the sheet is advanced after each closing of the shutter 12a to place an unexposed sheet section in register with the objective 13. The control circuit 11 is properly adjusted to account for the characteristics of the sheet 14.

The outputs 21, 22, 23 of the control circuit 11 are connected with the filters 15, 16, 17 via electromagnets 18, 19, 20. The electromagnets are energizable to move the respective filters along suitable guide means, not shown, across the light path when the corresponding color component should be intercepted, i.e., when the illumination of the sheet 14 in the corresponding color is to be terminated.

Figure 2:
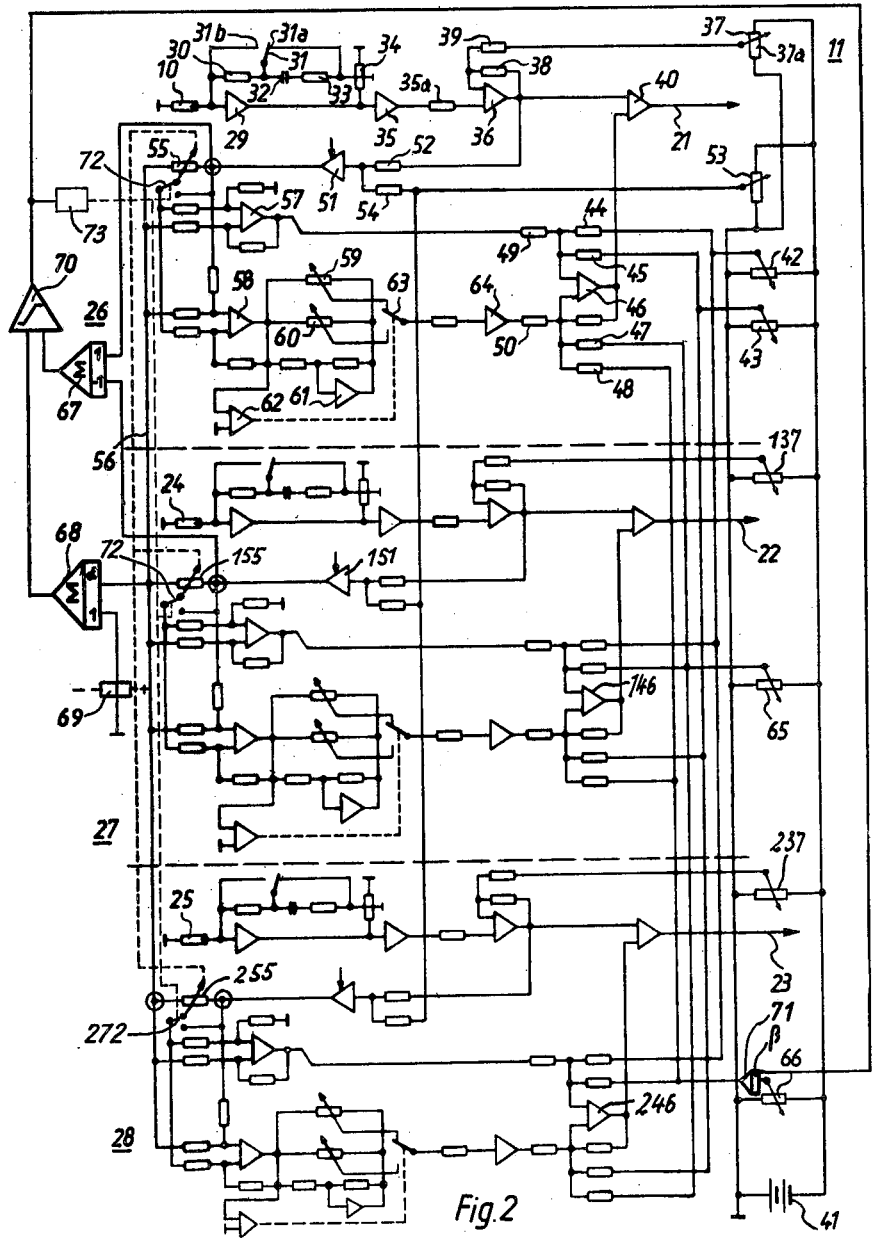
FIG. 2 is a diagram of the control circuit in the apparatus of FIG. 1.

The details of the control circuit 11 are shown in FIG. 2. The circuit comprises three sections or color channels 26, 27 and 28 each of which processes signals for one of the colors red, green and blue. With a single exception which will be pointed out below, the channels 26–28 are of identical design. Therefore, the following description will refer primarily to the red-color channel 26. The corresponding photodetector 10 consists of several, e.g., four, discrete photosensitive elements which are uniformly distributed about the main light path between the original 9 and the objective 13. However, the discrete photosensitive elements are connected in parallel; therefore, FIG. 2 merely shows a single detector 10. In FIG. 2, the detectors for the green and blue color components (in the channels 27 and 28) are respectively shown at 24 and 25.

The detector 10 is closely adjacent to an operational amplifier 29 whose feedback circuit includes a resistor 30 and an RC link including a capacitor 32 and a resistor 33. A switch 31 with fixed contacts 31a, 31b is provided to complete the feedback connection via resistor 30 or via RC link 32–33. The feedback circuit further comprises a potentiometer 34 whose purpose is to compensate for changes in format. The output of the operational amplifier 29 is connected with a logarithmic amplifier 35 which constitutes one input of a summing amplifier 36 via resistor 35a. The other input of the amplifier 36 is connected, via resistor 39, with the wiper 37a of a potentiometer 37 whose terminals are connected with the poles of a source 41 of constant DC potential. As shown in FIG. 2, one terminal of the potentiometer 37 is grounded. The feedback circuit of the summing amplifier 36 includes a further resistor 38. The output of the summing amplifier 36 constitutes one input of a differential (comparator) amplifier 40 whose output is connected with or constitutes the aforementioned red color output 21 of the control circuit 11. Thus, the output of the differential amplifier 40 is connected with the electromagnet 18 for the filter 15 which can be moved across the path of printing light to intercept red light.

The purpose of the potentiometer 37 is to store and to evaluate varying values such as the sensitivity of the sheet 14 in a particular color and/or special characteristics of a particular universal film. Once adjusted, the potentiometer 37 transmits a predetermined signal as long as the film (originals 9) and the emulsion number of paper (sheet 14) remain the same. The control circuit 11 may include signal storing circuits for the potentiometers 37 in all three channels 26, 27, 28, and such storing circuits can be switched, for example, from one type of film to another type of film, if they store information for each of these film types.

The other input of the differential amplifier 40 receives a voltage signal which is a resultant of several voltage signals depending on the factors which were taken into consideration during evaluation of the original 9. Such signals are furnished by several adjustable potentiometers including those shown at 42 and 43 in circuit with the energy source 41. The wipers of the potentiometers 42, 43 are both connected with one input of a summing amplifier 46 via respective resitors 44, 45. The other input of the amplifier 46 receives voltage signals from the channels 27, 28 via resistors 47, 48; such signals are modified in the channels 27 and 28. The one and the other input of the summing amplifier 46 further receive respective signals via resistors 49 and 50; such signals respectively denote the extent of color undercorrection and slope correction.

The voltage signal denoting the required compensation for undercorrection is taken off the output of the summing amplifier 36. The potential at the output of the summing amplifier 36 (in the illustrated position of the switch 31) denotes the logarithmic value of brightness of the original 9 in the corresponding color (red), namely, the deviation of such brightness from that of a calibration negative. The signal is transmitted to a sample-and-hold signal storing amplifier 51 via resistor 52. The input of the sample-and-hold amplifier 51 further receives a signal which denotes the selected slope center; such signal is transmitted by a potentiometer 53 via resistor 54. The purpose of the sample-and-hold amplifier 51 is to store a signal which denotes the difference between the intensity of signal at the output of the amplifier 36 (density value in the corresponding color) and the signal denoting the selected slope center (this signal corresponds to the color density of the aforementioned calibration negative). The amplifier 51 stores the difference signal during sampling as well as after the position of the switch 31 is changed, and transmits such a signal to one input of an integrating amplifier 67 in the circuit 11 during exposure of the sheet 14 to modulated light issuing from the source 1 and passing through the original 9. The output of the sample-and-hold amplifier 51 is connected with one terminal of a color undercorrection potentiometer 55. The other terminal of the potentiometer 55 is connected with a conductor 56 which connects it with the corresponding potentiometers 155, 255 of the channels 27 and 28. The wipers of the potentiometers 55, 155, 255 in the three channels are mounted on a common shaft (as indicated by broken lines) so that they can be adjusted in unison and to the same extent. The wiper of the potentiometer 55 in the channel 26 is connected with one input of a summing amplifier 57 the other input of which is connected with the conductor 56. The output of the summing amplifier 57 is connected with one input of the summing amplifier 46 via resistor 49.

The potential at the output of the summing amplifier 57 denotes the color undercorrection and is directly proportional to the selected angle at the potentiometer 55 which influences the potential with an adjustable factor $\alpha$ between zero and one.

An additional summing amplifier 58 is provided for slope potential. One input of the amplifier 58 is connected with the wiper of the color undercorrection potentiometer 55, and the other input of the amplifier 58 is connected with the conductor 56. The latter transmits a signal denoting the average color density deviation in all three channels. The output of the amplifier 58 is connected with one terminal of each of two potentiometers 59, 60 whose other terminals are connected with an inverting amplifier 61 for the output signal of the amplifier 58. Thus, depending on their positions, the wipers of the potentiometers 59, 60 can furnish positive or negative potentials of adjustable value. The wiper of the potentiometer 59 or 60 can be connected with an impedance inverter 64 by way of a switch 63 which is controlled by a differential (comparator) amplifier 62. The output of the impedance inverter 64 is connected with one input of the summing amplifier 46 via the resistor 50.

The differential amplifier 62 ascertains the sign of the potential which is transmitted by the output of the summing amplifier 58. When the deviation is positive (i.e., when the original 9 is overexposed), the amplifier 62 connects the impedance inverter 64 with one of the potentiometers 59, 60. The other of these potentiometers is connected with the impedance inverter 64 when the sign is negative (this denotes that the original 9 is underexposed). This renders it possible to illuminate underexposed and overexposed originals with different slopes which, in turn, guarantees a higher percentage of satisfactory first prints.

The influence of the factor $\alpha$ at the color undercorrection potentiometer 55 upon the potential at the output of the summing amplifier 58 insures that each density deviation of the original from the density of the calibrating negative exerts a pronounced influence upon the measurement. On the other hand, when $\alpha$ equals 1, the slope potentiometers are taken into consideration by transmitting voltage signals which correspond to an average deviation of density of the original from the density of the calibrating negative.

The conductor 56 is connected with one input of an integrating amplifier 68 the other input of which is connected with a constant current source 69. The signal at the output of the integrating amplifier 68 (wherein the signal which is transmitted to its one input via conductor 56 can be multiplied by the factor $\alpha$), is transmitted to one input of a differential (comparator) amplifier 70 the other input of which is connected to the output of an integrating amplifier 67. The two inputs of the amplifier 67 are connected, with different signs, to the outputs of the sample-and-hold amplifiers 51, 151 in the channels 26 and 27. As mentioned above, the channel 26 is the red-color channel, the channel 27 is the green-color channel, and the channel 28 is the blue-color channel. The signal at the "1" input of the amplifier 67 denotes the integrated transmittance of the original 9 in red color, and the signal at the input "—1" of the amplifier 68 denotes the integrated transmittance in green color. The signal at the output of the amplifier 67 denotes the ratio (difference or quotient) of the two integrated transmittance signals for the respective transparency.

The output of the comparator amplifier 70 is connected with one input of an integrating amplifier 71 which is adjustable with the factor $\beta$. The other input of the amplifier 71 is connected with the wiper of the color correction potentiometer 66 in the channel 28. The output of the amplifier 71 influences the blue color of the reproduction in a manner as disclosed in German Auslegeschrift No. 2,246,466, which corresponds to a commonly owned U.S. Pat. No. 3,867,029, issued on Feb. 2, 1975, the disclosure of which is incorporated herein by reference.

The operation:

The shutter 12a is assumed to be closed and the switch 31 is held in the illustrated position. The color filters 15, 16 and 17 are held in the fully retracted positions, and the color filters 6, 7 and 8 extend into the path of printing light to an extent which is necessary to insure that, for a calibration negative with a predetermined ratio of the primary colors, the duration of exposure of the original in each of the three colors is the same. The potentiometers 37, 137, 237 in the channels 26, 27 and 28 are adjusted to furnish signals which denote the sensitivity of copying material in the corresponding colors. The potentiometers 55, 59 and 60 are adjusted by the attendant on the basis of his experience in connection with the nature of originals, and their adjustment remains unchanged during the next-following copying operations. The sample-and-hold amplifier 51 receives a signal which denotes the difference between the signal at the output of the potentiometer 53 (density of the calibration negative) and the density of the original 9. The difference-denoting integrated transmittance signal is stored in the amplifier 51 until after completion of exposure of the corresponding original 9. Already during this stage of measurement, the amplifier 62 can proceed with determination whether the original is overexposed or underexposed, and connects the impedance inverter 64 with the potentiometer 59 or 60, depending on the result of comparison. The adjustment of wipers of the potentiometers 59 and 60 can be carried out simultaneously for all three channels, the same as for the potentiometers 55, 155 and 255.

The exposure of the sheet 14 to printing light begins with opening of the shutter 12a via electromagnet 12. At the same time, the position of the switch 31 is changed. This entails a constant increase of voltage between the plates of the capacitor 32. The resistor 33 effects a certain delaying action to compensate for the delay in actuation of filter moving means. Rise of voltage ahead of the logarithmic amplifier 35 entails a rise of voltage at the corresponding input of the amplifier 40 while the other input of this amplifier receives a signal which denotes the brightness of the original or a signal which is influenced by the deviation of color density and is stored in the sample-and-hold amplifier 51. The signal which represents the sum of all voltage signals transmitted to the inputs of the summing amplifier 46 is applied to the corresponding input of the amplifier 40. When the signals at the two inputs of the amplifier 40 are identical, the output 21 transmits a signal to the electromagnet 18 which moves the filter 15 across the path of printing light to terminate the exposure of sheet 14 to light in the red color.

If, prior to the making of the exposure, the attendant ascertains a pronounced color unbalance of the original 9, namely, an unbalance which is attributable to the motif and cannot be compensated for by automatic means, the exposure of sheet 14 by light of the corresponding color can be intensified by appropriate adjustment of the color correction potentiometer 43, 65 or 66 (channels 26, 27, 28). The potentials which is furnished by the wipers of these potentiometers influence the comparison voltages for the other colors, namely, the comparison voltages which are transmitted by the amplifiers 46, 146, 246 to the other input of 46. This is due to the provision of resistors 47 and 48 which are connected in the other channels. Such arrangement insures that the density of the entire copy is not altered as a result of adjustment of sensitivity of one of the channels because the sensitivity of the other two channels is changed by a corresponding value but in the opposite direction.

The exposure of the sheet 14 to printing light continues until each of the outputs 21, 22 and 23 transmits a signal which causes the corresponding electromagnet (18, 19, 20) to move the associated filter (15, 16, 17) across the path of copying light. The shutter 12a is then closed and the switch 31 is returned to the illustrated position which entails a discharge of the capacitors 32 and erasure of the stored signals. The original 9 is then replaced with the next original, whereby the sample-and-hold amplifier 51 stores a signal which denotes (for the red color) the deviation of density of the next original from the density of the calibration negative. The procedure is then repeated, in the aforedescribed manner, if necessary upon appropriate adjustment to effect a color or density correction (potentiometer 42) for all three channels.

In addition to the aforedescribed corrective measures, it is further possible to resort to an automatic discriminator circuit in order to furnish correction signals which are determined empirically in connection with the making of exposures in artificial light. The output of the integrating amplifier 67 which determines the density (integrated transmittance) quotient of or difference between the red and green colors transmits a comparison signal which, within certain limits, furnishes information pertaining to the color temperature of the light by which the original was exposed. As a rule, the ratio of red color to green color is much higher in exposures which were made by artificial light than in exposures made by daylight. While it is possible to make comparisons between the percentage of red color on the one hand and the percentage of green or blue color on the other hand, experiments indicate that the comparison between the red and green colors is more reliable. The ratio of transmittance values for red and green is compared with a reference signal which denotes a threshold value and is furnished by the integrating amplifier 68. The latter is adjustable in dependency on the overall density signal supplied by the conductor 56. When the amount of light by which the original was exposed is high, the intensity of comparison signal which causes a switchover of the amplifier 70 is higher than when the amount of exposure light for the original is less. The comparison signal at the output of the amplifier 70 is transmitted to the channel 28 via integrating amplifier 71 with an adjustable factor $\beta$. Such procedure is based on the recognition that, when exposed by artificial light, the original must normally receive a lower percentage of blue and/or green light.

The amplifier 70 can also effect additional corrections, for example, the deferral, reduction or elimination of correction (potentiometers 55, 155, 255) for underexposure by artificial light. It has been found that, when the original was exposed by artificial light, best results are normally achieved with full correction. To this end, one can employ switches which can be actuated to disconnect the potentiometers 55, 155, 255 and to replace such potentiometers with fixed resistors which furnish full correction signals for correction to gray or a hue near gray. The same applies for the density values.

One possibility of obtaining the full correction for copying from originals which were taken in artificial light is to utilize the potentiometers 55, 155 and 255 to the full extent of their resistances as the above-mentioned fixed resistors. As illustrated in FIG. 2, this can be achieved by incorporating respective switches 72, 172 and 272 into the respective lines which were described above as being connected to the wipers of the potentiometers 55, 155 and 255, respectively, for processing originals taken in daylight. An actuating device 73 of a conventional construction, such as an electromagnet, receives signals issuing from the amplified 70 and switches the switches 72, 172 and 272 over from the illustrated position into the other position when the magnitude of the above signals exceeds a predetermined value. In the other position, the full resistances of the potentiometers 55, 155 and 255 are active for forming the signal denoting the median gray density in the line 56 and the resistance between the output of the sample-and-hold amplifier 51 and the resistor situated ahead of the summing amplifier 57 becomes zero. Of course, if the next-following original to be copied from was taken in daylight, the device 73 will allow the switches 72, 172 and 272 to assume their illustrated positions.

It is further clear that the control circuit can utilize other types of detectors, such as photoresistors or photodiodes. The silicon photoelements are preferred at this time due to high sensitivity which remains unchanged within a wide range of brightnesses.

Furthermore, the potentiometers can be replaced with batteries of resistors and with means for connecting selected resistors into the circuit in order to furnish correction values.

An important advantage of the improved method and apparatus is that the characteristics of the signal denoting the ratio of colors are influenced by the overall density and the extent of exposure (density) of the original. This insures that the control circuit 11 transmits output signals by fully considering the fact that, as the amount of light by which an original was exposed decreases, the difference between the color ratios of exposures made by daylight and artificial light also decreases. It can be said that the change of reference signal at the output of the amplifier 68 involves altering the characteristic of such signal to reduce the intensity of that (first) signal at the output of the amplifier 67 which, when compared with the reference signal, results in the generation (by 70) of a comparison signal denoting the borderline or switchover point between exposures by daylight and artificial light when the density of a next-following transparency is less than the density of the preceding transparency.

Another important advantage of the improved method and apparatus is that the amplifier 67 compares red and green color signals rather than red and blue signals in accordance with the teaching of the aforementioned patent to Goddard et al. As fully explained above, it has been ascertained that a comparison of the colors red and green allows for more reliable discrimination between exposures made by daylight and exposures made by artificial light.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

The aforementioned German Auslegeschrift No. 2,246,466 corresponds to U.S. Pat. No. 3,867,029 granted Feb. 2, 1975 to Agfa-Gevaert and the disclosure of the U.S. patent is incorporated herein by reference.

What is claimed is:

1. A method of making color prints on color sensitive printing material from color transparencies made on universal film by exposure to light of different color temperature, especially daylight or artificial light, comprising the steps of uniformly illuminating successive transparencies by light including the three primary colors; ascertaining the density of each transparency and hence the amount of light by which the respective transparency was exposed; measuring the integrated transmittances of each transparency in two different colors which transmittances are influenced by the color temperature of light by which the respective transparency was exposed; generating for each transparency a first signal a characteristic of which denotes a predetermined ratio of said transmittances; comparing said characteristic of said first signal with the corresponding characteristic of a reference signal denoting a threshold value whereby the resulting comparison signal denotes the color temperature of light by which the respective transparency was exposed; varying said characteristic of said reference signal as a function of the overall density of the respective transparency; and regulating the reproduction of each transparency on printing material in dependency on the color temperature of light denoted by the respective comparison signal.

2. A method as defined in claim 1, wherein said ratio is the difference of said transmittances.

3. A method as defined in claim 1, wherein said ratio is the quotient of said transmittances.

4. A method as defined in claim 1, wherein said varying step includes altering the characteristic of said reference signal to reduce the intensity of that first signal which, when compared with said reference signal, results in the generation of a comparison signal denoting a lower borderline between exposures by daylight and artificial light when the overall density of the respective transparency is lower, and a higher borderline when the overall density is higher.

5. A method as defined in claim 4, wherein said different colors are red and green.

6. Apparatus for making color prints on color sensitive printing material from color transparencies made on universal film by exposure to light of different color temperature, especially daylight or artificial light, comprising means for uniformly illuminating successive transparencies by light including the three primary colors; and control means including means for ascertaining the density of each transparency and hence the amount of light by which the respective transparency was exposed, means for measuring the integrated transmittances of each transparency in two different colors which transmittances are influenced by the color temperature of light by which the respective transparency was exposed, means for generating for each transparency a first signal a characteristic of which denotes a predetermined ratio of said transmittances, means for comparing said characteristic of said first signal with the corresponding characteristic of a reference signal denoting a threshold value and for generating a third signal denoting the color temperature of light by which the respective transparency was exposed, means for varying said characteristic of said reference signal as a function of the overall density of the respective transparency, and means for regulating the reproduction of each transparency on printing material in dependency on the color temperature of light denoted by the respective third signal.

7. Apparatus as defined in claim 6, wherein said comparing means comprises a comparison amplifier having a first input, a second input and an output for transmission of said third signals, said means for generating said first signals including a first integrating amplifier having an output connected with one of said inputs, and said varying means comprising a second integrating amplifier having an output for transmission of said reference signal to the other of said inputs.

8. Apparatus as defined in claim 7, wherein said second integrating amplifier has a first and a second input, said density ascertaining means being connected with said first input for supplying a density-denoting signal thereto; and further comprising a source of constant current connected with said second input.

9. Apparatus as defined in claim 8, wherein said first integrating amplifier has a first and a second input, said measuring means comprising a discrete measuring device for each of said two different colors and each of said discrete measuring devices being connected with a different input of said first integrating amplifier.

10. Apparatus as defined in claim 8, wherein said density ascertaining means includes means for modifying the density-denoting signal prior to supply to said first input of said second integrating amplifier with a variable factor α.

11. Apparatus as defined in claim 6, wherein said control means includes three discrete sections for respectively regulating the exposure of printing material in red, green and blue colors, said regulating section for blue color including an integrating amplifier having an input connected with said comparing means to receive said third signal.

12. Apparatus as defined in claim 11, wherein said amplifier comprises means for modifying said comparison signal by a factor beta.

13. Apparatus as defined in claim 6, wherein said regulating means comprises a color undercorrection potentiometer for each of the primary colors and means for replacing such potentiometers with fixed resistors when said third signal denotes exposure by artificial light.

* * * * *